United States Patent Office
3,449,365
Patented June 10, 1969

3,449,365
2-IMINO-4-ALKALIDENE-1,3-DITHIOLANES AND THEIR PREPARATION
Thomas Andrew Lies, Montgomery Township, Somerset County, N.J., assignor to American Cyanamid Company, Stamford, Conn., a corporation of Maine
No Drawing. Filed June 5, 1967, Ser. No. 643,351
Int. Cl. C07d 71/00; C07c 153/07; A01n 9/12
U.S. Cl. 260—327          9 Claims

ABSTRACT OF THE DISCLOSURE

The present invention relates to novel ring-substituted iminodithiolanes, methods for preparing the same and to novel insecticidal phosphinyl imides. More particularly, the invention relates to a novel ring-substituted iminodithiolane which can be represented by the formula:

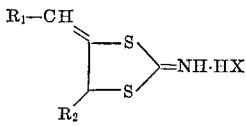

wherein $R_1$ stands for hydrogen or (lower)alkyl, $R_2$ is hydrogen, (lower)alkyl or phenyl, and X stands for the anion of an inorganic non-oxidizing strong acid, prepared by reacting approximately equimolar quantities of a non-oxidizing strong acid with a substituted 2-propyl dithiocarbamate having the structure:

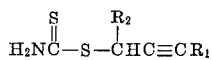

wherein $R_1$ and $R_2$ are as identified above. Still more particularly, the invention is concerned with phosphinyl imides of the structure:

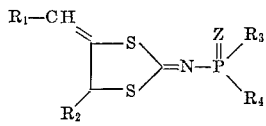

wherein $R_1$ and $R_2$ are the same as identified above, $R_3$ and $R_4$ are each (lower) alkyl, phenyl, (lower)alkoxy, alkylthio or (lower)alkylamino, and Z represents a sulfur or oxygen atom, prepared by phosphorylating ring-substituted iminodithiolanes.

In general, the phosphorylated compounds hereinabove identified can be conveniently synthesized by initially preparing the appropriate 2-imino-derivative of the desired heterosulfur moiety and, thereafter, effecting reaction between the latter hetero-sulfur moiety and the phosphorus-containing compound, such as an O,O-dialkylphosphorohalothioate, O,O-dialkylphosphorohaloate, O-alkyl alkanephosphonohalothioate, O-alkyl-N-mono-alkylphosphoroamidohaloate, O-alkyl-N,N-dialkylphosphoroamidohalothioate, N,N'-dialkylphosphorodiamidohalothioate, O-alkyl phenylphosphonohalothioate, O,O-diphenylphosphorohaloate, or the like.

The overall reaction may be graphically written as:

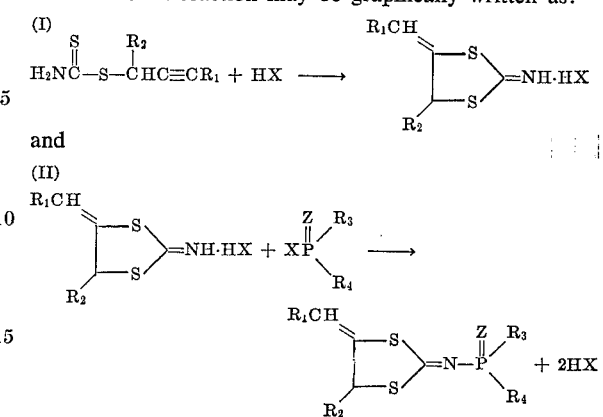

wherein $R_1$, $R_2$, $R_3$, $R_4$, X and Z are the same as identified above.

In brief, the substituted 2-propynyl dithiocarbamate reactant of Equation I can be readily prepared by reacting the appropriately-substituted 2-propynyl halide compound with ammonium dithiocarbamate. The propynyl halides per se similarly can be prepared inexpensively and with relative ease. Typical techniques for preparing these latter propynyl compounds are disclosed by R. A. Raphael, Acetylenic Compounds in Organic Synthesis, Butterworth's Scientific Publications, London, 1955, at pages 58 and 59.

Illustrative 2-propynyl dithiocarbamates are: 2-propynyl dithiocarbamate, 1-methyl-2-propynyl dithiocarbamate, 2-hexynyl dithiocarbamate and 1-phenyl-2-propynyl dithiocarbamate.

The 2-propynyl dithiocarbamate reactant is reacted utilizing at least approximately equimolar quantities of a non-oxidizing strong acid. For instance, the substituted 2-propynyl dithiocarbamate is reacted with a non-oxidizing strong acid, such as hydrochloric acid or sulfuric acid, or in the alternative with an aqueous-lower alkyl primary alcohol solution of such acid with the relative proportions of water and alcohol, such as to effect at least partial solubility of the reaction, in a ratio of 1.0 to 1.5 moles of acid per mole of substituted 2-propynyl dithiocarbamate at a temperature of 20° C. to 50° C. to produce a substituted iminodithiolane or its salt.

Typical phosphorohalothioates or the phosphorohaloate reactants employed in Equation II above are:

O,O-dimethyl phosphorochloridothioate,
O,O-diethyl phosphorochloridothioate,
O-methyl, O-ethyl phosphorochloridothioate,
O,O-di-iso-propyl phosphorobromidothioate,
O,O-di-n-butyl phosphorochloridothioate,
O,O-di-sec-pentyl phosphoroiodothioate,
O,O-dimethyl phosphorochloridate,
O,O-diethyl phosphorochloridate,
O-ethyl ethanephosphonochloridothioate,
O-ethyl-N,N-dimethyl phosphoramidochloridothioate,
O-ethyl phenylphosphonochloridothioate,
O-ethyl-N-isopropyl phosphoramidochloridothioate,
O-ethyl-N-methyl phosphoramidochloridothioate,
Diethyl phosphorochloridotrithioate, and
Diethylphosphinothioyl bromide.

It has been found that both illustrated reactions, (I) and (II), above, may be carried out in sequence without separation of the several reaction products, or they may be carried out stepwise. In general, the reaction represented by Equation II is carried out in the presence of an acid acceptor, which may be either an organic or inorganic base. Contemplated, for example are: sodium hydroxide, potassium hydroxide, lithium bicarbonate, sodium bicarbonate, triethyl amine and sodium acetate. Sufficient base for purposes of neutralizing the imino hydrohalide and the acid formed during reaction, is provided for optimum results.

The imides of the present invention possess insecticidal, acaricidal and nematocidal activity. They can also be employed as plasticizers and as ore-beneficiating reagents.

To facilitate a further understanding of the present invention, the following illustrative examples are presented. These are not to be taken as limitative of the invention. Unless otherwise stated, the parts are by weight and the analyses are in percent.

EXAMPLE A

Preparation of 2-propynyl dithiocarbamate 2-propynyl bromide (47.6 parts) is added dropwise to a stirred slurry of ammonium dithiocarbamate (44.0 parts) in methanol (200 parts, by volume) while the reaction temperature is maintained at 5° C.–9° C. by means of a cooling bath. When addition has been completed, the temperature is allowed to rise slowly to 20° C.; and the reaction mixture is poured on cracked ice. Resultant solid precipitate is collected and recrystallized from ether-pentane solution to yield 32.9 parts of 2-propynyl dithiocarbamate, melting point 50° C.–58.5° C. Recrystallization from ether-pentane solution gives the analytical sample, melting point 55° C.–58.5° C.

*Analysis.*—Calcd. for $C_4H_5NS_2$. Calcd.: C, 36.62; H, 3.84; N, 10.68; S, 48.89. Found: C, 36.24; H, 3.79; N, 10.41; S, 49.00.

EXAMPLE B

Preparation of 1-methyl-2-propynyl dithiocarbamate

Ammonium dithiocarbamate (13.2 parts) and 14.6 parts of 3-bromo-1-butyne (as prepared by the pyridine-catalyzed reaction of 3-butyn-2-ol and phosphorus tribromide) are reacted by following the procedure of Example A above. Recrystallization of the crude product is effected from methylene chloride-pentane solutions and yields 1-methyl-2-propynyl dithiocarbamate having a melting point of 63° C.–73.5° C. Recrystallizations from chloroform-carbon tetrachloride and chloroform solution yield an analytical sample whose melting point is in the range from 68° C.–75° C.

*Analysis.*—Calcd. for $C_5H_7NS_2$. Calcd.: C, 41.34; H, 4.86; N, 9.64; S, 44.15. Found: C, 41.12; H, 4.65; N, 9.85; S, 44.17.

EXAMPLE C

Preparation of 2-hexynyl dithiocarbamate

The reaction of Example A is followed wherein ammonium dithiocarbamate (22.0 parts) and 1-bromo-2-hexyne (24.0 parts) are reacted at 2° C.–4° C. to yield 24.4 parts (94%) of 2-hexynyl dithiocarbamate, whose melting point is 44.5° C.–46° C.

Two recrystallizations from chloroform-pentane solution yield the analytical sample, melting point 45° C.–47° C.

*Analysis.*—Calcd. for $C_7H_{11}NS_2$. Calcd.: C, 48.55; H, 6.40; N, 8.09; S, 36.96. Found: C, 48.36; H, 6.22; N, 7.78; S, 37.14.

EXAMPLE D

Preparation of 1-phenyl-2-propynyl dithiocarbamate

The procedure of Example A is followed wherein ammonium dithiocarbamate (22.0 parts) is reacted with 29.2 parts of 1-phenyl-1-bromo-2-propyne (prepared by the pyridine-catalyzed reaction of phenylethynylcarbinol with phosphorous tribromide) to yield 13.4 parts (43%) of 1-phenyl-2-propynyl dithiocarbamate, melting point 70° C.–75° C.

EXAMPLE 1

Preparation of 2-imino-4-methylene-1,3-dithiolane hydrochloride 2-propynyl dithiocarbamate (29.4 parts) is swirled in a suitable reaction vessel with concentrated hydrochloric acid (28 parts, by volume). The temperature of the resulting vigorous reaction is maintained at 25° C.–50° C., by intermittent cooling in an ice bath. When no further exotherm is noted, the red-brown reaction solution is poured into acetone. The flask is kept at 1° C. for several days; then the brown solid precipitate is collected and recrystallized from methanol-ether solution to yield 32.5 parts of 2-imino-4-methylene-1,3-dithiolane hydrochloride, having a melting point between 119° C. and 124° C. The structure of the product is determined by its infrared and nuclear magnetic resonance spectra.

A sample of the compound is recrystallized repeatedly from methanol-ether solution to yield the analytical sample, melting point 120° C.–123° C. (prior sintering).

*Analysis.*—Calcd. for $C_4H_6NS_2Cl$. Calcd.: C, 28.65; H, 3.61; N, 8.35; S, 38.25; Cl, 21.14. Found: C, 28.73; H, 3.53; N, 8.37; S, 38.29; Cl, 21.23.

EXAMPLE 2

Preparation of 2-imino-4-methylene-5-methyl-1,3-dithiolane hydrochloride 1-methyl-2-propynyl dithiocarbamate (4.8 parts) is stirred with concentrated hydrochloric acid (4.1 parts, by volume). The temperature of the resulting vigorous reaction is held at 25° C.–50° C., by intermittent cooling in ice. A red solution is obtained in about one hour; after 1.5 hours, the reaction solution is poured into acetone. The flask is kept at −15° C. for 16 hours. A precipitate of 2-imino-4-methylene-5-methyl-1,3-dithiolane hydrochloride which weighs 5.05 parts is collected and exhibits a melting point of 127.5° C.–130° C. (prior sintering).

The structure of the product is determined by its infrared and nuclear magnetic resonance spectra. Repeated recrystallization from methanol-ether solution yields the analytical sample having a melting point between 129° C. and 139° C.

*Analysis.*—Calcd. for $C_5H_8NS_2Cl$. Calcd.: C, 33.05; H, 4.44; N, 7.71; S, 35.39; Cl, 19.51. Found: C, 32.97; H, 4.56; N, 7.51; S, 34.96; Cl, 19.70.

EXAMPLE 3

Preparation of 2-imino-4-butylidene-1,3-dithiolane hydrochloride 2-hexynyl dithiocarbamate (19.1 parts) is stirred with concentrated hydrochloric acid (14.0 parts, by volume) and the ensuing reaction is moderated by occasional cooling, which limits the temperature to 35° C. After 20 minutes, the heterogeneous reaction mixture is mixed with absolute alcohol to increase solution of the organic phase. When an exotherm is no longer apparent, the still-heterogeneous reaction mixture is dissolved in acetone; and the solution is concentrated in a rotary evaporator to leave a residue which is dissolved in absolute ethanol.

Concentration of the ethanolic solution in a rotary evaporator leaves a gummy residue which is triturated with 450 parts of benzene, by volume, to effect solidification. The white solid product, 2-imino-4-butylidene-1,3-dithiolane hydrochloride, weighs 20.6 parts and melts at 122° C.–127° C.

The structure of the product is determined from its infrared and nuclear magnetic resonance spectra. Recrystallization from methanol-ether at temperatures below 25° C. gives the analytical sample, melting point 127° C.–130° C. (prior sintering).

*Analysis.*—Calcd. for $C_7H_{12}NS_2Cl$. Calcd.: C, 40.08; H, 5.77; N, 6.68; S, 30.57; Cl, 16.90. Found: C, 40.20; H, 5.68; N, 6.71; S, 30.39; Cl. 17.02.

EXAMPLE 4

Preparation of 2-imino-4-methylene-5-phenyl-1,3-dithiolane hydrochloride

A mixture of 1-phenyl-2-propynyl dithiocarbamate (12.0 parts), concentrated hydrochloric acid (7.5 parts, by volume (and absolute ethanol (7 parts, by volume) is stirred. The temperature of the ensuing reaction is maintained at about 28° C. to 38° C. After about two hours, the exotherm is completed; and the reaction mixture, which has become a moist solid, is mixed with a mixture of 95% ethanol and acetone; and 9.7 parts of a white, insoluble product, 2-imino-4-methylene-5-phenyl-1,3-dithiolane hydrochloride, is filtered off from the cooled mixture. Another 1.9 parts of the product is obtained by precipitating it with benzene from an alcoholic solution of the residue from the concentrated mother liquor.

The desired product exhibits a decomposition point of 184° C. (prior darkening) and weighs 11.6 parts. The structure of the product is determined from its infrared and nuclear magnetic resonance spectra. Two recrystallizations from methanolether solution at 25° C. and below yield the analytical sample, which decomposes at 179° C.–184.5° C. (prior darkening).

*Analysis.*—Calcd. for $C_{10}H_{10}NS_2Cl$. Calcd.: C, 49.26; H, 4.414; N, 5.75; S, 26.31; Cl. 14.54. Found: C, 49.10; H, 4.14; N, 5.71; S, 26.36; Cl. 14.73.

EXAMPLE 5

Preparation of 2-diethoxyphosphinylimino-4-methylene-1,3-dithiolane hydrochloride To a stirred mixture of 5.0 parts of 2-imino-4-methylene-1,3-dithiolane hydrochloride and 6.3 parts of potassium bicarbonate in 100 parts (by volume) of benzene and 10 parts of water are added 5.7 parts of diethylphosphorochloridate in 10 parts, by volume, of benzene over about a 10 minute period. After an additional 3 to 4 hours, the organic phase is separated from the resultant mixture and washed successively with dilute salt solution, a salt-hydrochloric acid solution, a salt-sodium hydroxide solution, and finally with a saturated salt solution. After further drying the mixture with sodium sulfate, concentration in vacuo leaves 7.4 parts of product as a light orange oil having an index of refraction ($n_D^{25}$) equal to 1.5378. Further purification is effected either by molecular distillation at 100° C. and 1–5 microns pressure or by chromatography on silica gel.

*Analysis.*—Calcd. for $C_8H_{14}NO_3PS_2$. Calcd.: C, 35.94; H, 5.28; N, 5.24; P, 11.59; S, 23.99. Found: C, 35.71; H, 5.49; N, 5.06; P, 11.08 S, 23.80.

EXAMPLE 6

Preparation of 2-diethoxyphosphinylimino-4-butylidene-1,3-dithiolane

The procedure of Example 5 is followed in every detail except that 2-imino-4-butylidene-1,3-dithiolane hydrochloride is substituted for 2-imino-4-methylene-1,3-dithiolane hydrochloride. The product is obtained as a yellow oil, having an index of refraction ($n_D^{25}$) equal to 1.5487.

*Analysis.*—Calcd. for $C_{11}H_{20}NO_3PS_2$. Calcd.: C, 42.69; H, 6.51; N, 4.53; P, 10.01; S, 20.72. Found: C, 42.80; H, 6.55; N, 4.58; P, 9.85; S, 20.99.

EXAMPLE 7

Preparation of 2-dimethoxyphosphinothioylimino-4-methylene-1,3-dithiolane

The procedure of Example 5 is followed in every detail; however, dimethylphosphorochloridothioate is substituted for diethylphosphorochloridate. The crude product is purified by molecular distillation at between 105° C. and 125° C. at 1–5 microns pressure and collected as a yellow oil whose refractive index ($n_D^{25}$) equals 1.6277.

*Analysis.*—Calcd. for $C_6H_{10}NO_2PS_3$. Calcd.: C, 28.22; H, 3.95; N, 5.49; P, 12.13; S, 37.68. Found: C, 28.40; H, 4.04; N, 5.47; P, 12.25; S, 37.82.

The insecticidal activity of the compounds of the invention is demonstrated by the following tests wherein the procedures employed are set forth below.

EXAMPLE 8

Bean aphid (*Aphis fabae* Scopoli).—Compounds are tested as 0.1%, 0.01%, and 0.001% solutions or suspensions in 65% acetone/35% water. Two-inch fiber pots, each containing a nasturtium plant two inches high and infested with about 150 aphids two days earlier, are sprayed with test solution to give complete coverage of the aphids and the plants. The sprayed plants are laid on their sides on white enamel trays which have had the edges coated with No. 50 SAE oil as a barrier. Mortality estimates are made after holding for two days at 70° F., and 50% R.H.

Southern armyworm (*Prodenia eridania* (Cramer)).—The 0.1% and 0.01% solutions from the aphid test are also used for this test. Sieva lima bean primary leaves are dipped for three seconds in the test solution and set in a hood on a screen to dry. When dry, each leaf is placed in a four-inch petri dish which has a moist filter paper in the bottom and ten third-instar armyworm larvae about ⅜″ long. The dishes are covered and held at 80° F., and 60% R.H. After two days, mortality counts and estimates of the amount of feeding are made. Compounds showing partial kill and/or inhibition of feeding are held an extra day for further observations.

Confused flour beetle (*Tribolium confusum* Jacquelin duVal).—Compounds are formulated as 1% dusts by mixing 0.1 part of the compound with 9.9 parts of talc, wetting with 5 parts, by volume, of acetone and grinding with a mortar and pestle until dry. 125 mg. of this 1% dust is then blown into the top of a dust settling tower with a short blast of air. The dust is allowed to settle on four-inch petri dishes for two minutes, giving a deposit of approximately 87 mg./sq. foot of the 1% dust. The dishes are removed and 25 adult confused flour beetles are added immediately. The dishes are held for three days at 80° F. and 60% R.H. following which mortality counts are made.

Large milkweed bug (*Oncopeltus fasciatus* Dallas).—The 1% dusts described above are used in this test. 25 mg. of the 1% dust is sprinkled evenly over the glass bottom of a seven-inch diameter cage giving a deposit of approximately 94 mg./sq. foot of the 1% dust. Water is supplied in a two-ounce bottle with a cotton wick, twenty adult bugs are added and a screen cover placed on the top. Mortality counts are made after holding for three days at 80° F. and 60% R.H.

German cockroach (*Blatella germanica* (Linnaeus)).—The procedure is the same as for the large milkweed bug test, except that in this test only adult males are used.

Housefly (*Musca domestica* (Linnaeus)).—Groups of 25 adult female houseflies are lightly anesthetized with carbon dioxide, placed in wide-mouth pint mason jars, and covered with a screen cap. The test compound is formulated as an emulsion containing 50 p.p.m. of test material, an emulsifier, acetone, and water. The mouth of the vial is covered with a single layer of cheesecloth, inverted and placed on the screen cap so that the flies can feed on the solution through the screen. Mortality counts are made after two days at 80° F.

Southern corn rootworm (*Diabrotica undecimpunctata howardi* Barber).—The compound is formulated as a dust and incorporated into the soil at the equivalent of 50 pounds per acre. The soil is subsampled into bottles, and ten 6- to 8-day old rootworm larvae added to each bottle, which is then capped. Mortality counts are made after six days at 80° F., 60% R.H.

Representative compounds are placed in the above tests and the results observed are recorded in table below.

TABLE

| Structure | S.A.W.[1] | | | Aphids | | | Mites | | | TC,[2] 1% | MB,[3] 1% | GC,[4] 1% | Systemics | | | |
|---|---|---|---|---|---|---|---|---|---|---|---|---|---|---|---|---|
| | | | | | | | | | | | | | Mites | | S.A.W.[1] | |
| | .1% | .01% | .001% | .1% | .01% | .001% | .1% | .01% | .001% | | | | 100 p.p.m. | 10 p.p.m. | 100 p.p.m. | 10 p.p.m. |
| 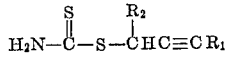 | 100 | 80 | 0 | 100 | 100 | 100 | 100 | 100 | 84 | 100 | 20 | 75 | 100 | 100 | 100 | 0 |
| 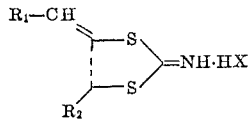 | 100 | 100 | 20 | 100 | 100 | 100 | 100 | 100 | 81 | 100 | 100 | 100 | 100 | 100 | 100 | 80 |
| 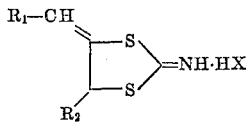 | ----- | 90 | 0 | ----- | ----- | 90 | ----- | 100 | 0 | 100 | 80 | 95 | 90 | 0 | 100 | 60 |

[1] Southern Armyworm.
[2] *Tribolium Confusum* (Confused flour beatle.
[3] Milkweed bug.
[4] German cockroach.

I claim:
1. A method of effecting the cyclization of substituted 2-propynyl dithiocarbamates to obtain ring-substituted iminodithiolane salts which comprises the steps of: reacting a substituted 2-propynyl dithiocarbamate compound of the structure:

$$H_2N-\overset{S}{\overset{\|}{C}}-S-\overset{R_2}{\overset{|}{C}}HC\equiv CR_1$$

wherein $R_1$ is selected from the group consisting of hydrogen and (lower)alkyl, and $R_2$ is selected from the group consisting of hydrogen, (lower)alkyl, and phenyl, with a non-oxidizing strong acid in substantially equimolar amounts at a temperature between about 20° C. and 50° C. and, thereafter, recovering a ring-substituted compound of the structure:

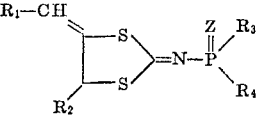

wherein $R_1$ and $R_2$ are the same as described above, and where HX is a non-oxidizing strong acid.

2. A method according to claim 1 wherein $R_1$ and $R_2$ are both hydrogen.
3. A method according to claim 1 wherein $R_1$ is hydrogen and $R_2$ is methyl.
4. A method according to claim 1 wherein $R_1$ is n-propyl and $R_2$ is hydrogen.
5. A method according to claim 1 wherein the non-oxidizing strong acid is hydrochloric acid.

6. A compound having the structure:

$$\begin{array}{c} R_1-CH \\ \| \\ R_2 \end{array} \overset{S}{\underset{S}{\diagdown\diagup}} =NH \cdot HX$$

wherein HX is a non-oxidizing strong acid, $R_1$ is selected from the group consisting of hydrogen and lower alkyl, and $R_2$ is selected from the group consisting of hydrogen, lower alkyl and phenyl.

7. A compound according to claim 6 wherein $R_1$ and $R_2$ are both hydrogen.
8. A compound according to claim 6 wherein $R_1$ is hydrogen and $R_2$ is methyl.
9. A compound having the structure:

$$\begin{array}{c} R_1-CH \\ \| \\ R_2 \end{array} \overset{S}{\underset{S}{\diagdown\diagup}} =N-\overset{Z}{\overset{\|}{P}}\overset{R_3}{\underset{R_4}{\diagup}}$$

wherein $R_1$ is selected from the group containing hydrogen and lower alkyl, $R_2$ is selected from the group containing hydrogen, lower alkyl and phenyl, $R_3$ and $R_4$ each stands for lower alkoxy, and Z represents oxygen or sulfur.

References Cited

UNITED STATES PATENTS 3,389,148   6/1968   Lies _____ 260—327

JAMES A. PATTEN, *Primary Examiner.*

U.S. Cl. X.R.

260—455; 424—277